United States Patent [19]

Haskett et al.

[11] Patent Number: 4,469,654
[45] Date of Patent: Sep. 4, 1984

[54] EDM ELECTRODES

[75] Inventors: Thomas E. Haskett, Oakdale; Joseph J. Schmitt, White Bear Lake, both of Minn.

[73] Assignee: Minnesota Mining and Manufacturing Company, St. Paul, Minn.

[21] Appl. No.: 428,146

[22] Filed: Sep. 29, 1982

Related U.S. Application Data

[62] Division of Ser. No. 119,164, Feb. 6, 1980, Pat. No. 4,373,127.

[51] Int. Cl.³ .................................................. B32B 9/06
[52] U.S. Cl. ..................................... 264/62; 264/105; 501/87; 501/88
[58] Field of Search ................ 264/60, 61, 62, 332, 264/105; 200/264; 428/539.5; 501/87, 88

[56] References Cited

U.S. PATENT DOCUMENTS

| | | | |
|---|---|---|---|
| 2,098,062 | 11/1937 | Palmer | 171/325 |
| 2,289,708 | 7/1942 | Jackson | 260/264 |
| 3,235,346 | 2/1966 | Hucke | 29/190 |
| 3,241,949 | 3/1966 | Kunda | 75/103 |
| 3,348,967 | 10/1967 | Hucke | 264/332 |
| 3,549,408 | 12/1970 | Bocme | 427/310 |
| 3,823,002 | 7/1974 | Kirby | 428/539.5 |
| 3,929,476 | 12/1975 | Kirby | 419/27 |
| 4,027,134 | 5/1977 | Arakawa et al. | 219/69 E |
| 4,153,755 | 5/1979 | Rothkegel | 200/264 |

FOREIGN PATENT DOCUMENTS 2005728 4/1979 United Kingdom.

OTHER PUBLICATIONS

Wetting of Ceramic Oxides by Molten Metals under Ultra High Vacuum, F. L. Harding and D. R. Rossington, J. Am. Cer. Soc. 53, 2, 87-90, (1970).
The Wetting of TaC by Liquid Cu and Liquid Ag, S. K. Rhee, J. Am. Cer. Soc. 55, 3, 157-159, (1972).
Hirayama, Honda and Okabe, "A Study of the Electrode Materials for Electric Discharge Machining", Nippon Tungsten Review, vol. 8, pp. 28-31, (1975).
Honda, Okabe and Hara, "Study of the Electrode Material for Electric Discharge Machining (2nd Report)", Nippon Tungsten Review, vol. 9, pp. 23-29, (1976).

Primary Examiner—John A. Parrish
Attorney, Agent, or Firm—Donald M. Sell; James A. Smith; David R. Cleveland

[57] ABSTRACT

A precision molded electrical discharge machining electrode is made by shaping a preform from granules of carbon and granules of a refractory material selected from the group consisting of tungsten, molybdenum, carbides thereof, and stoichiometric and hyperstoichiometric carbides of the other elements of the groups IVB, VB, and VIB of the Periodic Table of the Elements, the carbon and refractory granules being interconnected in the form of a skeleton at their contiguous points of contact, and infiltrating the preform with copper, silver, or alloys containing those metals.

4 Claims, 7 Drawing Figures

EDM ELECTRODES

This is a division of application Ser. No. 119,164 filed Feb. 6, 1980, now U.S. Pat. No. 4,373,127.

This invention relates to a process for forming infiltrated electrical discharge machining electrodes. In another aspect, it relates to a process for making copper or silver infiltrated carbon-containing electrical discharge machining electrodes and to the electrodes so made. In another aspect, it relates to a monolithic skeletal preform useful in making such electrodes. In yet a further aspect, this invention relates to electrical discharge machining electrodes which are precise replicas of an original pattern or master.

Powder metallurgy techniques have been employed to make precision shaped electrical discharge machining ("EDM") electrodes from infiltratable skeletal preforms of consolidated refractory metal powders which are infiltrated with lower melting metals such as copper or silver. U.S. Pat. Nos. 3,823,002 and 3,929,476 describe a process for forming such electrodes from, for example, tungsten powder which is molded and fired to form a skeletal preform having preceptible necking between the contiguous smaller tungsten granules, and then infiltrated with molten copper. The infiltration step takes place through capillary action ("wicking") at ambient pressure, i.e. at zero pressure differential between the exterior and the interior of the skeletal preform. Infiltration under these conditions appears to be due, in part, to the ability of molten copper to "wet" the refractory metal powder from which the skeletal preform is made. Commercial EDM electrodes made by the above process are referred to in the art as "molded copper-tungsten" electrodes and are characterized by low shrinkage during processing and close fidelity of replication between the finished electrodes and the original master from which the electrode mold was formed. Such electrodes also have uniform density and uniform electrical properties. Also, such electrodes can be made in complex shapes having high aspect ratios, stepped or undercut profiles, and intricate surface detail. Large numbers of such electrodes may be made from a single mold master.

EDM electrodes have also been made from porous carbon bodies which are impregnated with copper. They are not made using the above-described powder molding process. Because copper does not "wet" carbon at ambient pressure, such electrodes have generally been made by forcing molten copper into the interior of a graphite body under heat and pressure. Such electrodes are referred to in the art as "copper-graphite" electrodes and are characterized by very high EDM cutting rates. Due to the pressures required to carry out the copper impregnation step and limitations inherent in the manufacture of a suitable die in which to mount the graphite body during impregnation, such copper-graphite electrodes have generally been manufactured in simple shapes (such as bar stock). If copper-graphite electrodes are to be made having a complex shape with a high aspect ratio, a stepped or undercut profile, or intricate surface detail, it is ordinarily necessary to create electrodes having such a complex shape by machining each electrode from a simple shape (such as bar stock) to the desired complex shape. This process involves waste of materials and requires precision machining of each electrode. Also, the machining process "disturbs" the copper and graphite at the surface of the electrode, resulting in an electrode with a surface microstructure which differs from the microstructure within the body of the electrode.

Other references disclose methods for infiltrating or impregnating a carbon-containing body with copper. For example, in U.S. Pat. No. 3,549,408, carbon is treated with boric acid or ammonium phosphate followed by copper infiltration under pressure. Also, U.S. Pat. Nos. 3,235,346 and 3,348,967 describe a method for infiltrating carbon by alloying an infiltrant such as copper with carbide forming metals. Because these methods utilize applied pressure, surface treatment of the carbon-containing preform, or introduction into the carbon body of materials which react with carbon, they could tend to promote dimensional changes in the carbon body during infiltration and thereby be unsuitable to the manufacture of a precision EDM electrode with a complex shape.

Other references have described copper or silver infiltrated composite structures which contain carbon. For example, U.S. Pat. No. 4,153,755 discloses a method for preparing electrical contacts from composites containing tungsten, graphite, silver or copper, and a wetting promoting metal such as iron, cobalt, or nickel. The steps of that method involve mixing powdered tungsten, powdered silver or copper, the wetting promoting metal, and graphite, compacting the mixture in a press, sintering and then cooling the compacted mass, granulating the sintered, cooled mass and admixing it with additional graphite, pressing the resulting mixture into a porous form, and impregnating the porous part with silver or copper. That patent discloses that without the use of a wetting promoting metal and a two-step graphite addition, the pressed, impregnated contact has a "bothersome" residual porosity and most of the graphite in the contact reacts with the tungsten to form tungsten carbide (see col. 2, lines 11 to 65). The wetting promoting metals used in the method of that patent (iron, cobalt and nickel) all dissolve in copper or silver and thereupon react with carbon. Such reactions would lead to dimensional changes in the porous part during infiltration (e.g., shrinkage) and would make the method of that patent unsuited to accurate replication of precision EDM electrodes having complex shapes.

U.S. Pat. No. 2,289,708 describes an automatic electric circuit breaker contact set, one contact of which is a composite formed of silver, tungsen, and approximately 1 percent by weight of carbon (equivalent to up to about 6 to 7 volume percent). These contacts are said to have reduced contact resistance and less tendency to weld together. If such a contact were prepared having a thickness greater than about 1.5 mm, the contact would have non-uniform density due to the pressing operation by which it was formed. The pressing operation of that patent would not ordinarily be useful in forming EDM electrodes having complex shapes and requiring uniform EDM cutting performance.

It is an object of the present invention to achieve essentially complete infiltration of a precision shaped carbon-containing EDM electrode but without the need for applied pressure infiltration, conventional surface treatment of the carbon, the use of wetting-promoting metals which react with carbon, or alloying of the infiltrant with other metals. Another object of the invention is to provide a process for providing accurately replicated EDM electrodes at low cost. An additional object of the invention is the formation of EDM electrodes with good dimensional stability. A further object of the invention is the formation of EDM electrodes with high cutting rates and low wear rates.

The present invention provides in one aspect an electrical discharge machining electrode consisting essentially of:

(1) a monolithic skeleton consisting essentially of (a) granules of carbon and (b) granules of a refractory material selected from the group consisting of tungsten, molybdenum, carbides of these two elements, and stoichiometric and hyperstoichiometric carbides of the other elements of groups IVB, VB, and VIB of the Periodic Table of the Elements, the majority of said carbon granules being greater than about one micrometer in mean diameter, said refractory material being wettable by molten copper or silver, said carbon granules and said refractory granules being interconnected at their contiguous points of contact; and (2) a continuous phase consisting essentially of copper, silver, or alloys containing copper or silver, and occupying the connected porosity in said skeleton;

wherein the volume percent of said carbon, said refractory, and said continuous phase are on or within the boundaries DEFG of FIG. 7, and the fraction expressed by the Formula $$\frac{(\text{volume \% C})(\text{surface area C})}{(\text{volume \% R})(\text{surface area R})} \qquad I$$

wherein C is said carbon, R is said refractory, the volume percent terms are the fraction of said article occupied by C or R, and the surface area terms are the surface areas in m²/g of said carbon or refractory granules measured before said carbon or refractory granules are used in making said article, is less than about 75, said electrode thereby being a monolithic structure consisting essentially of two intermeshed matrices, having homogeneous density, being substantially free of voids, and being substantially free of materials which are soluble in said continuous phase and reactive with carbon.

In the accompanying drawing.

Figure 1:
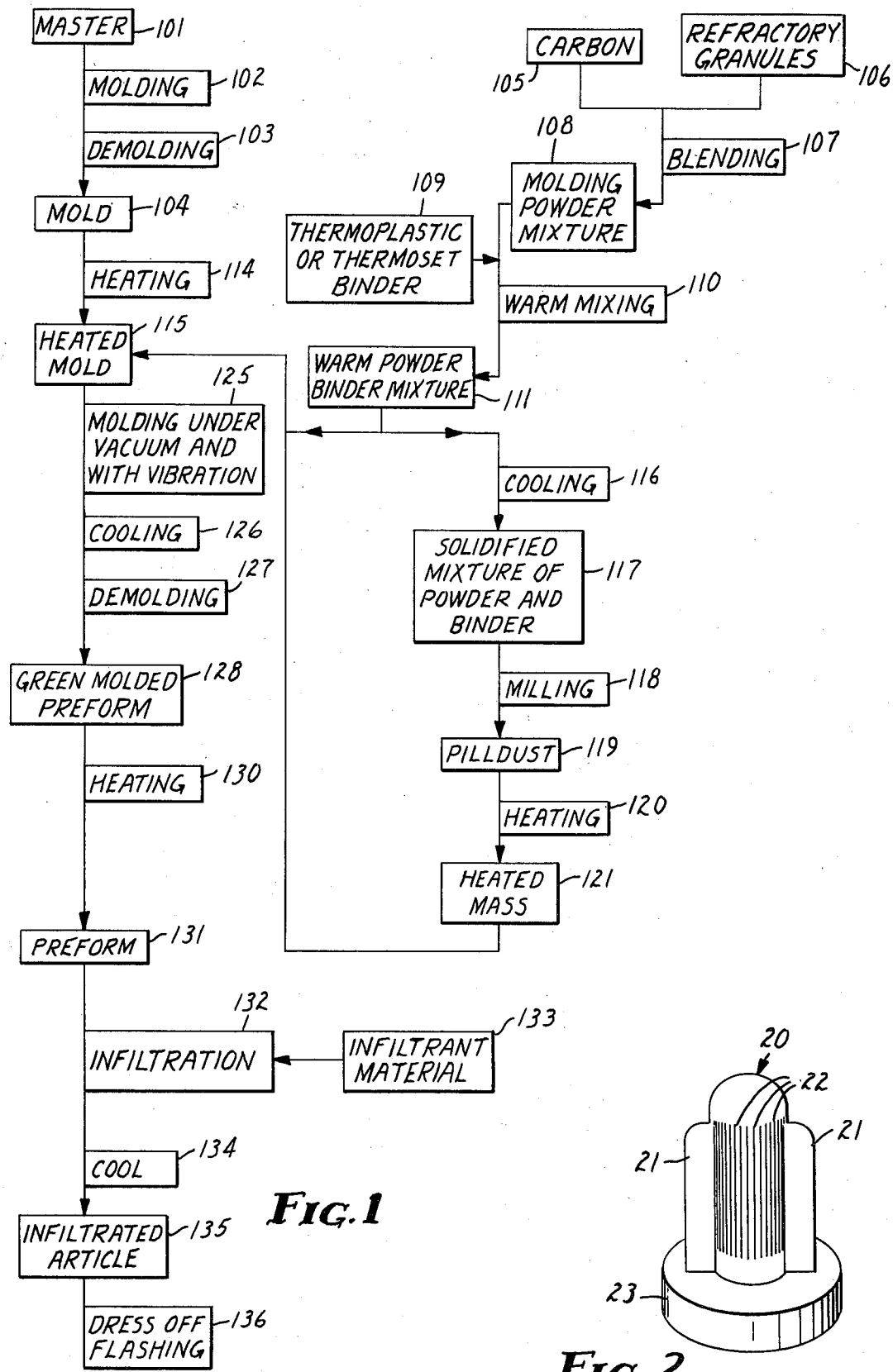
FIG. 1 is a flow diagram illustrating a process of the present invention for making the EDM electrodes thereof.

In the practice of this invention, a replicating master in the desired shape is used to prepare a flexible rubber mold. Next, carbon granules (generally in the form of amorphous carbon or graphite granules or powder and hereinafter referred to generally as "carbon") are mixed with certain granules of refractory material (viz., tungsten, molybdenum, carbides of either, and stoichiometric and hyperstoichiometric carbides of the other elements of groups IVB, VB, and VIB of the Periodic Table of the Elements), said refractory material, when in its solid form being wettable by copper, silver, or alloys containing copper or silver. "Stoichiometric" carbides, as used herein, are carbides with a stoichiometric combination of metal and carbon. "Hyperstoichiometric" carbides, as used herein, are carbides containing an amount of carbon in excess of the amount of carbon in said stoichiometric carbides (in contrast to "hypostoichiometric" carbides, which contain an amount of metal in excess of the amount of metal in said stoichiometric carbides). The mixture of carbon and refractory granules is mixed with a heat fugitive organic binder and shaped and heated to form a monolithic, infiltratable, skeletal preform having the same shape as the ultimate EDM electrode. The preform is then infiltrated with molten metal (viz., copper, silver, or alloys containing these elemental metals) at ambient pressure, i.e. at a zero pressure differential between the exterior and the interior of the skeletal preform (such ambient pressure infiltration being referred to hereafter as "infiltration").

The replicating master used to prepare precision shaped EDM electrodes according to the present invention can be made from wood, plastic, metal, or other machinable or formable material. If a finished electrode prepared according to the process of the present invention exhibits dimensional change (e.g. shrinkage), then the dimensions of the replicating master can be adjusted (e.g. made larger) to compensate for those dimensional changes occurring during processing.

The molding materials which can be used to prepare a flexible mold in the process of this invention are those which cure to an elastic or flexible rubbery form and generally have a Shore A durometer value of about 25-60, and reproduce the fine details of the replicating master without significant dimensional change, e.g. without more than 1 percent linear change from the replicating master. The molding materials should not be degraded when heated to molding temperatures, e.g. 180° C., and should have a low cure temperature, e.g. room temperature. A low temperature curing molding material will form a mold which maintains close dimensional control from master to mold. A high temperature curing molding material will generally produce a mold having dimensions substantially different from those of the master. To maintain dimensional control, it is preferable that the mold material are curable silicone rubbers, such as those described in Bulletin "RTV" 08-347 of January, 1969, of the Dow Corning Co., and low exotherm urethane resins. Such molding materials cure to an elastic or rubbery form having a low post cure shrinkage. The molding material can be reinforced by the addition of about 30 volume percent of less than 44 micrometer glass beads in order to improve dimensional control in the molding process.

The amount of molding material used to form a mold of the replicating master can vary depending on the particular molding material used and the shape of the replicating master. It has been found that about 10-14 cubic centimeters of molding material for each cubic centimeter of the replicating master will form a mold which retains the desired flexible properties and also has sufficient strength to support the small hydrostatic head produced by the warm powder-binder mixture in the mold before solidification of the binder.

The molding conditions, hereinafter discussed, for molding the EDM electrodes of this invention permit the use of an inexpensive soft, elastic or rubbery mold because the only pressure applied is the hydrostatic head of the warm powder-binder mixture in the mold, which pressure is very small and causes negligible distortion. The mild molding conditions thus help ensure a precisely molded green preform even though a highly deformable mold is used. In addition, the molding technique results in a molded green preform with a uniform density. Uniform density of the molded green preform helps prevent uneven dimensional change during infiltration.

The carbon granules can be used in the form of free flowing, discrete beads, spheres, flakes, equiaxed particles, or agglomerates thereof, with irregular or smooth surfaces. Equiaxed graphite particles having less than about 200 micrometer diameter and having less than about 15 m²/g surface area are preferably used, since they are electrically conductive, inexpensive, and can be readily used to make precision shaped EDM electrodes according to the present invention. The distribution of sizes of the individual carbon granules is dependent upon the performance requirements of the EDM electrode. For example, the particle size distribution and shape of the carbon granules greatly affect the packing efficiency of the skeletal matrix. Higher packing efficiency generally leads to lower shrinkage during infiltration, thereby aiding in the accurate replication of complex electrode shapes from a master or pattern shape. Higher packing efficiency generally yields an EDM electrode which in use has higher metal removal rate and generally minimal wear. Also, use of small carbon granules in an EDM electrode generally leads to improved (i.e. finer) workpiece surface finish and increased metal removal rate, but at an increase in end and corner electrode wear. Use of large carbon granules in the EDM electrodes of the present invention generally leads to a rougher workpiece finish and decreased metal removal rate, but decreased end and corner electrode wear.

The carbon volume percent is high enough (e.g. about 5 volume percent or greater) to give improved EDM burn rate performance compared to an EDM electrode made without carbon granules. At levels around 5 volume percent of 7 to 50 micrometer carbon granules, EDM electrodes of the present invention exhibit increased rough mode cutting rates and noticeably smoother burning performance (i.e. the electrode operates with less hesitation and less arcing of the electrode occurs) compared to a copper-tungsten EDM electrode made without carbon granules.

For high EDM cutting rates, a large number of carbon granules should be present. This can be achieved by using very fine carbon particles and/or by using a high volume percent of carbon. In general, the carbon volume percent in an EDM electrode of the present invention should be preferably about 10 volume percent or greater, more preferably about 15 volume percent or greater, and most preferably about 20 to 30 volume percent. Also, as the ratio of the amount of carbon to refractory is increased, roughing mode metal removal rate of the electrode will increase but the workpiece will exhibit a rougher surface finish and wearing of the end and corners of the electrode will increase.

The surface area of the carbon granules used also affects the ease with which the carbon-containing skeletal preform may be infiltrated. As the surface area of carbon within the preform increases, a point will be reached at which one can not carry out infiltration of a preform with copper, silver, or alloys containing copper or silver. In general, small carbon granules have a larger surface area than large carbon granules. However, commercially available carbon granules sometimes exhibit widely varying surface areas among samples of similar particle size and distribution. It is preferred that the carbon granules employed have a small surface area (as measured by nitrogen adsorption before the introduction of the granules into a preform), preferably less than about 15 m²/g, and more preferably less than about 7 m²/g. Infiltration of the shaped preform with copper, silver or their alloys is carried out in observance of the above formula I:

$$\frac{(\text{volume \% C})(\text{surface area C})}{(\text{volume \% R})(\text{surface area R})} < \text{about } 75$$

wherein C is carbon, R is refractory, the volume percent terms are the fraction of the final shaped electrode occupied by C or R, and the surface area terms are the surface areas (in m²/g) of the carbon or refractory granules to be used in making the preform. Through observance of the above relationship, shaped preforms containing very high loadings of carbon (viz., greater than 20 volume percent) can be infiltrated.

If surface area data are unavailable, then mean particle diameter data may be used as an approximate guide to determine whether infiltration will occur. For example, if graphite granules and unimodal refractory granules are mixed, and the graphite granules have a mean particle diameter of about 25 micrometers, then the ratio of mean particle diameters of graphite granules to refractory granules should be about 0.5 to 1 or greater at low carbon volume loadings (e.g. a volume percent ratio of carbon to refractory of 1:9), and about 3.5 to 1 or greater at very high carbon volume loadings (e.g. a volume percent ratio of carbon to refractory of 7:3). Also, if graphite granules and unimodal refractory granules are mixed, and the graphite granules have a mean particle diameter of about 100 micrometers, then the ratio of mean particle diameters of graphite granules to refractory granules should be about 1 to 1 or greater at low carbon volume loadings, and about 14 to 1 or greater at very high carbon volume loadings. However, the above tests based upon mean particle diameter are less reliable than a test based upon actual surface area limits, and should be used only if surface area data is unavailable or would be inconvenient to obtain.

Several commercial powdered carbons useful in the present invention are set out below in Table I.

TABLE I

| | Size*, μm | Surface Area**, m²/g |
|---|---|---|
| "Versar" amorphous carbon beads (Versar Carbon Co.) | 30–80 | 6.56 |
| "1264" Equiaxed graphite particles (Asbury Graphite Mills) | 40–200 | 2.85 |
| "4234" Equiaxed graphite particles (Asbury Graphite Mills) | 52–690 | 1.82 |
| "4349" Equiaxed graphite paticles (Asbury Graphite Mills) | 10–200 | 7.2 |
| "A-200" Equiaxed graphite particles (Union Carbide Co. of Canada) | 7–50 | 6.72 |
| "KS-5" Equiaxed graphite particles (Dixon Carbon Co.) | 1–10 | 11.6 |
| "Statex MT bead" amorphous carbon granules and agglomerates (Cities Services Co.) | <20 (agglomerates) | 9.3 |

*Size listed represents a range within which the central 90% of the sample particles lie, as measured by Coulter Counter.
**As measured by nitrogen adsorption.

The granules of refractory material can be tungsten, molybdenum, carbides of either, stoichiometric and hyperstoichiometric carbides of the other elements of groups IVB, VB, and VIB of the Periodic Table of the Elements, or mixtures thereof, with molybdenum, tungsten, molybdenum carbide, and tungsten carbide being preferred. The refractory granules may also be molybdenum precipitated onto a carbon nucleating agent according to the method of U.S. Pat. No. 3,241,949 (such precipitated molybdenum being included hereafter in the term "molybdenum" unless otherwise stated). The refractory granules can be used in the form of discrete beads, spheres, flakes, needles, or equiaxed particles. Preferably the refractory granules are less than about 200 micrometers in mean diameter. The refractory material should be wettable by molten copper or silver, that is, the refractory should have a sessile drop test wetting angle value of ninety degrees or less under a hydrogen atmosphere. The above test is described, for example, in "Wetting of Ceramic Oxides by Molten Metals under Ultra High Vacuum", F. L. Harding and D. R. Rossington, J. Am. Cer. Soc. 53, 2, 87–90 (1970) and in "The Wetting of TaC by Liquid Cu and Liquid Ag", S. K. Rhee, J. Am. Cer. Soc. 55, 3, 157–159 (1972).

The refractory material should also be essentially insoluble in the infiltrant metal at infiltration temperatures (e.g. temperatures of about 1150° C. for copper), as this will prevent or minimize the occurrence of solid solution reactions between the refractory material and carbon granules within the skeletal preform and thereby minimize dimensional changes in the EDM electrode during infiltration. Some portion of the carbon in an EDM electrode of the present invention may be combined with refractory metal to form refractory carbide. This effect may be pronounced with very small refractory particles (e.g. 1 micrometer tungsten).

From the above it may be seen that the chosen refractory is wettable by the infiltrant but is not soluble in the infiltrant (and minimally reactive or unreactive with the carbon in the preform under infiltration conditions). In general, a refractory material which is soluble in molten copper or silver will also be wettable by such a melt. However, the converse is not true—although many refractory materials which are wettable by molten copper or silver are also soluble in such a melt, a few are not. Refractory materials which are useful in the present invention are wettable by molten copper or silver but not soluble in such a melt and include tungsten, molybdenum, carbides of these two elements, and stoichiometric and hyperstoichiometric carbides of the other elements of groups IVB, VB, and VIB of the Periodic Table of the Elements. Several suitable commercial refractory granules are set out below in Table II.

TABLE II

|  | Mean diameter, μm | Size*, μm | Surface area**, m²/g |
|---|---|---|---|
| Tungsten (General Electric Co.) | 0.8 | 0.7–14 | 1.45 |
| Tungsten (General Electric Co.) | 1.5 | 0.9–15 | 0.55 |
| Tungsten (GTE Sylvania Inc.) | 3 | 6–19 | 0.10 |
| Tungsten (General Electric Co.) | 3 | 5–19 | 0.12 |
| Tungsten (General Electric Co.) | 15 | 8–74 | 0.05 |
| "M-70" Tungsten (GTE Sylvania Inc.) | — | 40–200 | 0.01 |
| Molybdenum (General Electric Co.) | 4–6 | — | 0.33 |
| "SD-252" Molybdenum 0.8 m particles and agglomerates (GTE Sylvania Inc.) | <8 (agglomerates) | — | 0.44 |
| "SC-60" Tungsten carbide (General Electric Co.) | — | 4–35 | 0.18 |
| "WOOO-PL" Tungsten carbide (Wah-Chang Div. of Teledyne Corp.) | 1.1 | 0.3–5.0 | 1.47 |
| Molybdenum carbide (Ventron Corp.) | 4.0 | 1.4–11.1 | 1.8 |
| Molybdenum coated carbon (Sherritt-Gordon Mines Ltd.) 50/50 wt. % | — | 10–50 | 2.16 |
| Molybdenum coated carbon (Sherritt-Gordon Mines Ltd.) 75/25 wt. % | — | 10–50 | 2.70 |

*Size listed represents a range within which the central 90% of the sample particles lie, as measured by Coulter Counter.
**As measured by nitrogen adsorption.

Mixtures of two size distributions of refractory granules (hereafter bimodal mixtures) with a ratio of mean particle sizes of approximately 7–10 to 1 give better packing efficiency in a carbon-containing preform (i.e., lower interstitial void space and therefor lower infiltrant concentration) and are preferred. Multimodal mixtures containing three or more size distributions of refractory granules can also be used. For example, 55 volume percent packing efficiency can be obtained in a preform when graphite granules less than 74 micrometers in size are combined with an equal volume of a bimodal mixture of 65 wt.%, 15 micrometer mean diameter tungsten granules and 35 wt.%, 1.5 micrometer mean diameter tungsten granules. In contrast, substitution of unimodal 1.5 micrometer mean diameter tungsten granules in place of the bimodal mixture in the above preform yields only 50 volume percent packing efficiency. Also, increasing the volume percent of fine refractory particles relative to coarse refractory particles tends to improve workpiece surface finish. For example, an EDM electrode containing a bimodal mixture of 65 wt.% 15 micrometer mean diameter tungsten granules and 35 wt.% 1.5 micrometer mean diameter tungsten granules achieves better workpiece surface finish than an EDM electrode in which the relative portions of 15 and 1.5 micrometer tungsten particles are 80% and 20%, respectively.

The carbon and refractory granules are combined by dry mixing, for example, in a V-blender. The proportions of each of these two components affect the cost and electrical performance of the electrode. Since carbon is relatively inexpensive, increasing the carbon proportion in the preform will lower the cost and improve the rough mode cutting performance of the electrode. However, increasing the refractory proportion in the preform will generally improve workpiece surface finish and reduce electrode end and corner wear.

Other materials which do not interfere with the desired electrical or mechanical properties of the electrode can also be added to the carbon and refractory granules. For example, small amounts of oxides may be added to enhance burn rate or reduce electrode wear. Also, small amounts (viz., about 5 to 10 volume percent) of powdered infiltrant metal or infiltrant metal oxide (such infiltrant metal oxide being referred to hereafter as "infiltrant metal") may be added to the carbon and refractory granules. The particle size and amount of such a powdered infiltrant metal addition should be such as to avoid destroying continuity of the skeleton of carbon and refractory granules. Addition of powdered infiltrant metal can lower the cost of the finished EDM electrode, cause a slight decrease in roughness of the workpiece, and cause a slight increase in electrode roughing mode removal rate. The powdered infiltrant metal melts during infiltration and becomes a part of the continuous infiltrant phase, without destroying the integrity of the skeleton of carbon and refractory granules or unduly impairing the dimensional stability of the finished EDM electrode.

The method of forming the electrode involves mixing carbon granules and refractory granules (and any other desired additional materials such as oxides or powdered infiltrant metal) with a heat fugitive organic binder, molding the powder-binder mixture, curing the mold contents, removing the bulk of the binder by heating the molded shape, thereby forming a skeletal preform, and infiltrating the preform with molten metal. Referring to FIG. 1, a replicating master 101 is used to mold 102 a flexible form in the desired shape by surrounding the master with an elastic, rubbery molding compound, e.g. "RTV-J" silicone rubber (commercially available from Dow Corning Co.) and demolding 103 the master from the cured, solid rubbery mold 104. An admixture of carbon 105 and refractory granules 106 is blended 107 to form a powder mixture 108 which is next combined with a heat fugitive thermoplastic or thermosetting binder 109 by warm mixing 110 (without causing premature cure of the binder if a thermosetting binder is used) in a blending device, e.g. a sigma blade mixer, resulting in formation of a warm powder-binder mixture 111. The carbon and refractory granules are uniformly dispersed in the binder matrix, conducive to forming a preform with homogeneous (i.e. uniform) density which will be essentially uniformly porous when the binder is thermally degraded. Use of carbons having a large particle size results in a powder-binder mixture with better flow properties (i.e. lower viscosity) than a powder-binder mixture made with carbons having a small particle size. The binder can be, for example, paraffin, "Emerest 2642" (a polyethylene glycol distearate with a number average molecular weight of 400), or an amine cured epoxy. Preferably during subsequent heating of the preform, the chosen binder degrades or decomposes at a low temperature and leaves a minimal carbonaceous residue. Thermoplastic binders generally leave lower carbonaceous residues than thermoset binders and have better flow properties when mixed with high surface area carbon granules. However, use of a thermoset binder yields a preform with a higher green strength and may offer production advantages. If powdered infiltrant metal is added to a mixture of carbon, refractory granules, and thermoset binder, then a sufficiently potent curing agent should be used to ensure that the preform will cure despite the inhibiting effect such powdered infiltrant metal may have on some thermoset curing agents.

The flexible mold 104 is heated 114 and the warm powder-binder mixture 111 fed directly to the heated mold 115. Optionally, instead of immediately molding the warm powder-binder mixture, a mixture made with a thermoplastic binder can be cooled 116 to a solidified mass 117 and milled 118, preferably in a vacuum, to a granular or free-flowing consistency ("pill dust" 119) for easy handling and storage, and subsequently heated 120 to a heated mass 121 at the time of the molding step. The heated mold and its contents (the warm powder-binder mixture 111 or heated mass 121) are vibrated under vacuum 125 in order to degas the mixture. The mold contents are allowed to cool 126 and harden. The molded granule-binder shape is then demolded 127 by applying a vacuum to the outer walls of the flexible mold. After demolding, the resultant "green" molded preform 128 is a faithful replica of the dimensions of the master. This molded shape has good green strength and homogeneous density due to the hardened matrix of binder which holds the carbon and refractory granules in a skeletal shape.

Homogeneous density of the green molded preform is important in the subsequent heating and infiltration steps. A homogeneous density will minimize or prevent shape distortion when the green molded preform is heated and infiltrated. Also, a homogeneous density will minimize or prevent the formation of localized pockets of infiltrant metal which otherwise would make the ultimate finished EDM electrode exhibit unstable and nonuniform electrical, mechanical, or physical properties.

The green molded preform 128 is packed in a nonreactive refractory powder, e.g. alumina or silica, to prevent sagging or loss of dimension, and subsequently heated 130 in a furnace to a temperature of about 780° C. to thermally degrade the binder. The bulk of the binder is thereby removed from the article as gaseous products of combustion, leaving an amorphous carbonaceous residue which tacks the carbon and refractory granules together. The carbon, refractory granules, and carbonaceous residue form a rigid, handleable, skeletal preform 131. The carbon and refractory granules (and any granules of added materials such as oxides or powdered infiltrant metal) are in contiguous relationship. They are interconnected or adhered together due to the cementing action of the carbonaceous binder residue but essentially retain their original particle shapes when viewed under optical magnification. If the green molded preform is heated at higher temperatures (i.e. 900°–1400° C. as carried out in U.S. Pat. Nos. 3,823,002 and 3,929,476) then some of the contiguous refractory granules will tend to sinter together and exhibit perceptible "necking" at their contiguous points of contact when viewed under optical magnification. Preferably necking is avoided in the practice of this invention by heating the green molded preform at temperatures of about 700°–800° C., in order to avoid dimensional changes brought about by necking of the refractory granules.

A skeletal preform made by the above method will have minimal "closed porosity" (inaccessible void spaces which are wholly within the body of the skeleton so as to be sealed off or isolated from porosity which communicates with the exterior of the preform). The major portion of the void space in such a preform will represent "connected porosity" (void space which is not sealed off from the exterior of the preform). Only connected porosity can be filled by molten infiltrant.

The infiltration step 132 is carried out by placing the chosen infiltrant 133 (in solidified form) in contact with the base of the skeletal preform 131 and heating it slightly above the melting point of the infiltrant. The infiltrant can be copper, silver, or an alloy containing copper or silver. Copper is the preferred infiltrant. The amount of infiltrant is usually chosen to be slightly in excess of the amount necessary to fill the connected porosity of the skeleton (as determined by calculation or empirically). The surfaces of the skeleton which will be coincident with the working surfaces of the final infiltrated EDM electrode optionally can be coated with a dispersion of zirconia in acetone in order to eliminate overwetting, i.e. "beading" or "blooming" of infiltrant on those surfaces of the preform, or any overwetting can be overcome by subsequent sandblasting of the infiltrated electrode. When the melting point of the infiltrant has been reached, the infiltrant will melt and "wick" into the interior (the connected porosity) of the skeletal preform by capillary action, without the need for applied pressure. The time necessary to infiltrate the preform will vary depending upon the rate of heating, the gross dimensions of the preform being infiltrated, the wetting characteristics of the infiltrant, and the diameter of the porous passages within the skeleton. However, 30 seconds to 5 minutes at a temperature slightly above the melting point of the infiltrant has been found sufficient to properly infiltrate the preform. The infiltration step is preferably carried out by supporting the preform and infiltrant metal in or on a bed of alumina carried in a crucible, for example, one made of graphite, alumina, or mullite. The infiltrated preform is then cooled 134, the infiltrated EDM electrode 135 extracted, and any excess flashing dressed off 136.

The resulting infiltrated EDM electrode is substantially void free (i.e., it has a density at least 95% and preferably 97% or more of the theoretical density based upon the densities of the constituents of the preform and of the infiltrant phase). Essentially the only uninfiltrated space in the EDM electrode will be the closed porosity of the original preform. The connected porosity of the original preform will be essentially completely occupied by the infiltrant phase.

The finished EDM electrode has good dimensional stability when compared to the replicating master, that is, the major dimensions of the EDM electrode are within 1 percent, and preferably within 0.5 percent of the corresponding major dimensions of the replicating master. Any deviation from the dimensions of the replicating master is preferably of the same magnitude and direction for each electrode prepared from a single mold so that corrections in the dimensions of a run of electrodes may be made by alteration of the dimensions of the replicating master.

In addition, the finished EDM electrode has a high EDM cutting rate (e.g. above about 120 mm$^3$/minute for a tungsten-containing electrode operated in roughing mode). Also the finished electrode operates at a low "wear ratio" (ratio of workpiece cutting depth to longitudinal electrode wear), preferably at a wear ratio above about 5, more preferably at a wear ratio above about 25, and most preferably at a wear ratio above about 50.

The finished EDM electrode has homogeneous density, that is, it has a density which is uniform when compared over small volumes (e.g. 1 mm$^3$) near the surface and within the interior of the electrode. This contributes to the good dimensional stability of the EDM electrodes of this invention. Also, if irregularly shaped granules of carbon or refractory are used, the finished electrode will have randomly oriented carbon and refractory granules and randomly oriented, randomly shaped closed porosity distributed throughout the electrode. If flaked granules of carbon or refractory are used, the finished electrode will have essentially randomly oriented carbon and refractory granules and essentially randomly oriented and randomly shaped closed porosity distributed throughout the electrode, with some anisotropic orientation of the flaked granules due to settling during molding.

Several other metals were examined and found not to promote copper or silver infiltration of a carbon-containing skeletal preform as readily as granules of tungsten, molybdenum, carbides thereof, and stoichiometric and hyperstoichiometric carbides of the other elements of groups IVB, VB, and VIB of the Periodic Table of the Elements. For example, only partial infiltration was achieved when chromium granules were used in place of the above refractory granules. Use of tantalum led to severe oxidation during the infiltration step, as tantalum is a very effective "oxygen getter" (a substance which readily forms an oxide) which removed oxygen from less stable oxides.

Figure 2:
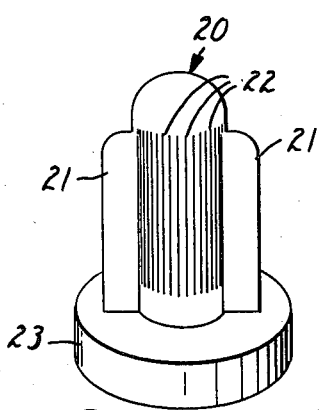
FIG. 2 is a view in perspective of an EDM electrode of the present invention.

In FIG. 2 is shown an EDM electrode prepared as described above. The electrode 20 has a generally cylindrical shape with protruding flutes 21, serrations 22 and a base 23. The base of the electrode is at least one-quarter inch in thickness. The profile of the electrode lying above the base forms a utilitarian surface or working surface which in the particular electrode shown corresponds to the outer profile of a commonly used electrical connector. By "utilitarian surface" is meant a surface bearing a predetermined, desired, relief pattern. The relief pattern corresponds to the shape of a useful shaped article shaped by injection molding or stamping or to the shape of a desired machined cavity (e.g. a hole to be made in a hard material such as a turbine blade). The relief pattern is generally prismatic, curved (i.e. convex or concave), or both prismatic and curved in shape, and can optionally bear one or more utilitarian depressions lying within the general prismatic or curved shape corresponding to the relief pattern, and/or can bear one or more utilitarian projections lying outside the general prismatic or curved shape corresponding to the relief pattern, with the utilitarian surface (including any utilitarian depressions or utilitarian projections) deviating from the predetermined desired relief pattern by no more than one percent in any lineal dimension and preferably by no more than 0.5 percent in any lineal dimension. The surface of the relief pattern is free of disturbed metal. The base of the electrode serves as a reference and mounting surface by means of which the electrode can be fixtured in an EDM machine. In use, the electrode is fixtured in the EDM machine, energized, and then slowly forced into the surface of a workpiece (e.g. tool steel). The electrical discharge passing between electrode and workpiece erodes a cavity in the workpiece in a female shape corresponding to the electrode shape. The cavity is fine-finished using the same or a different EDM electrode and optionally mechanically polished. The completed cavity may be used as, for example, a die in which materials such as plastics are shaped by stamping or injection molding. The shape of such a shaped plastic part will correspond to the shape of the utilitarian or working surface of the EDM electrode.

Figure 3:
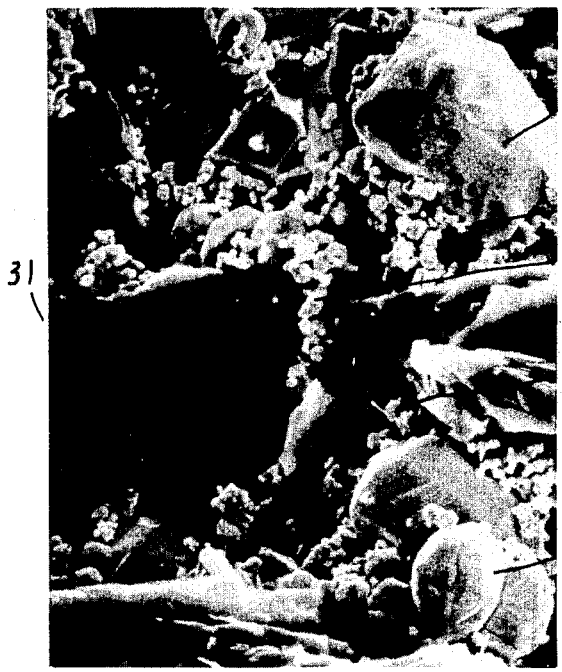
FIG. 3 is a photomicrograph of an uninfiltrated skeletal preform of this invention.

The structure of the skeletal preform may be further understood by reference to FIG. 3. FIG. 3 is a scanning electron micrograph of the interior of an uninfiltrated shaped preform (i.e. after thermally degrading the heat fugitive binder and before infiltration of the preform with molten metal). The micrograph was prepared by fracturing the preform in a Charpy Impact tester (Tinius Olsen Testing Mach. Co.) and viewing the fractured sample surface at a 45° angle of incidence and a magnification of 2100X. The preform contained 30% by volume "A-200" graphite granules, 30% by volume of a bimodal mixture of tungsten granules consisting of 65 weight % 15 micrometer mean diameter tungsten and 35 weight % 1.5 micrometer mean diameter tungsten granules, and 40% by volume void space. The dark shaded granules 31 in FIG. 3 are carbon and the lightly shaded granules 32, 33 and 33' are tungsten. Ninety percent of the granules 31 are between 7 and 50 micrometer in mean diameter as measured by Coulter Counter. The granules 32 are representative members of the 15 micrometer mean diameter tungsten fraction, and the granules 33 and 33' are representative members of the 1.5 micrometer mean diameter tungsten fraction. As may be seen from an inspection of FIG. 3, some of the tungsten granules (e.g., those designated 33) are interconnected with the larger carbon granules while other tungsten granules (e.g., those designated 33') appear to be unconnected to carbon but interconnected with other tungsten granules. The various granules retain their discrete shapes. The granules are tacked or adhered together by the carbonaceous binder residue and retain their positions in the preform even if the sample is vigorously shaken, indicating that the various granules are firmly held in place and act as a monolith.

Figure 4:
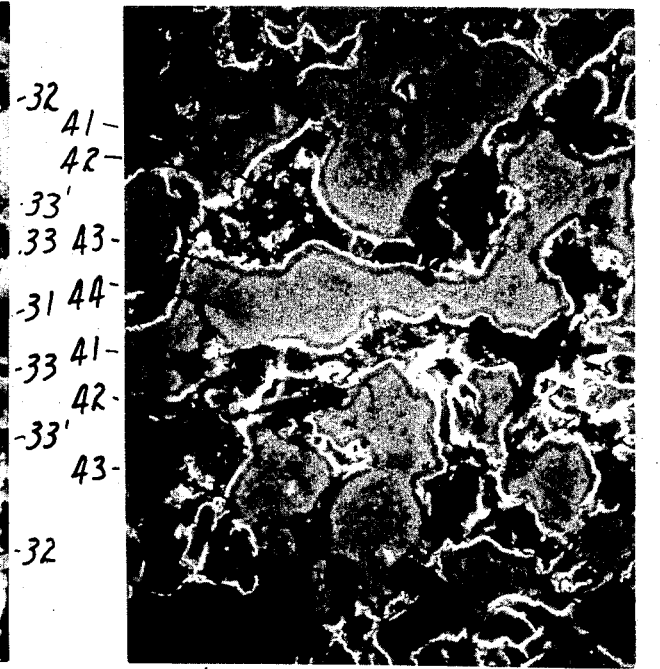
FIG. 4, FIG. 5 and FIG. 6 are photomicrographs at various modifications of an infiltrated EDM electrode of this invention.
Figure 5:
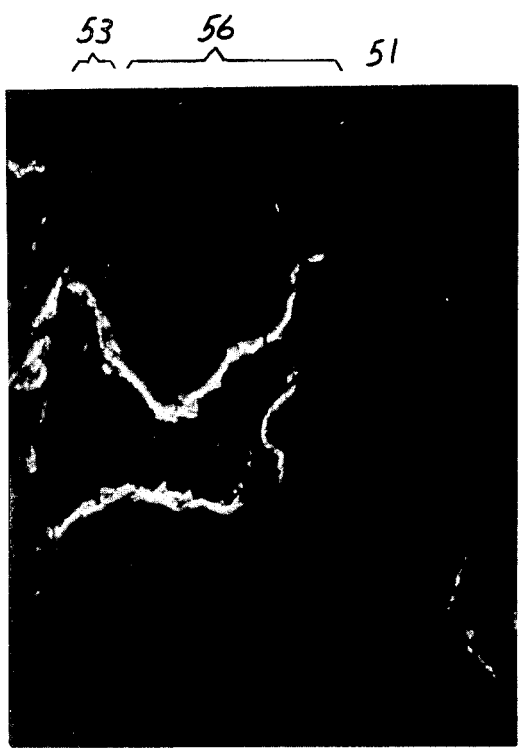
Figure 6:
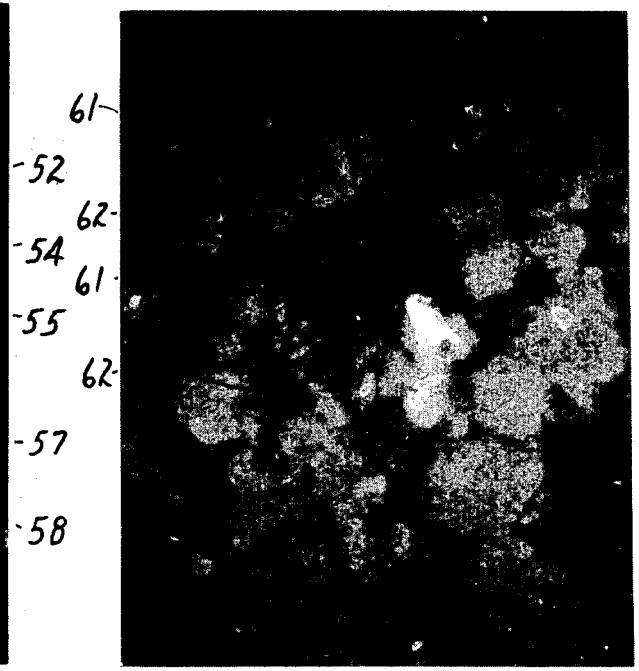

The metallurgical structure of an infiltrated EDM electrode may be further understood by reference to FIG. 4, FIG. 5, and FIG. 6. These figures are scanning electron micrographs of an EDM electrode of the invention containing carbon, molybdenum and copper. A green molded preform was prepared by combining 70 volume percent "A-200" graphite and 30 volume percent 6 micrometer mean diameter molybdenum with a thermoplastic heat fugitive binder. The binder was thermally degraded and removed by heating the green molded preform in an argon atmosphere, resulting in formation of a skeletal preform containing graphite and tungsten. The preform was then infiltrated with copper. The final, shaped, electrode had uniformly distributed concentrations of carbon, molybdenum, and copper of 28 volume percent, 12 volume percent, and 60 volume percent, respectively. The sample electrode was then polished by standard metallurgical procedures.

In FIG. 4 the polished surface of the sample is shown at a magnification of 420X. The composition of the indicated areas of FIG. 4 (and FIG. 5 and FIG. 6) was determined by scanning electron microscopy (SEM). The black areas 41 are graphite, the dark grey areas 43 are copper and molybdenum, and the lighter grey areas 44 are also copper and molybdenum but are relatively richer in molybdenum than the dark grey areas 43. The white fringes 42 appear to be due to electron charging.

In FIG. 5 the polished surface of the sample is shown at a magnification of 1800X. The black areas 51 are graphite and the dark grey areas 53 are copper and molybdenum. However, at this magnification the grey areas 53 do not have the homogeneous appearance of the grey areas 43 of FIG. 4. Instead, lighter colored molybdenum granules 54 and darker copper zones 55 may be seen within the dark grey area 53. The molybdenum granules 54 appear to be in contact with the graphite 51. The dark grey area 53 has a width of appropriately 3 micrometers. Some copper appears to reside adjacent the graphite 51 within dark grey area 53. The light grey area 56 does not have the homogeneous appearance of the corresponding light grey area 44 of FIG. 4. Within the area labeled 56 may be seen lighter colored molybdenum granules 57 and darker copper zones 58. The white fringes 52 appear to be due to electron charging.

In FIG. 6 is shown a portion of the light grey area 56 of FIG. 5, at a magnification of 3000X. The light colored molybdenum granules 61 and the dark copper zones 62 may be seen distinctly. The SEM signal within each area 61 and 62 gives a strong indication of molybdenum and copper respectively. The molybdenum granules 61 generally appear to be in contiguous relationship throughout the area represented in FIG. 6.

When viewed under an optical microscope at a magnification of 750X, the graphitic areas of the sample are a deep black, the molybdenum containing areas of the sample are nearly white, and the copper zones of the sample are reddish in color.

FIG. 4, FIG. 5 and FIG. 6 illustrate the substantially void-free composition of the EDM electrodes of the present invention. These figures also provide evidence that the interconnected skeletal structure illustrated in the preform of FIG. 3 is preserved after the preform has been infiltrated with molten metal.

Figure 7:
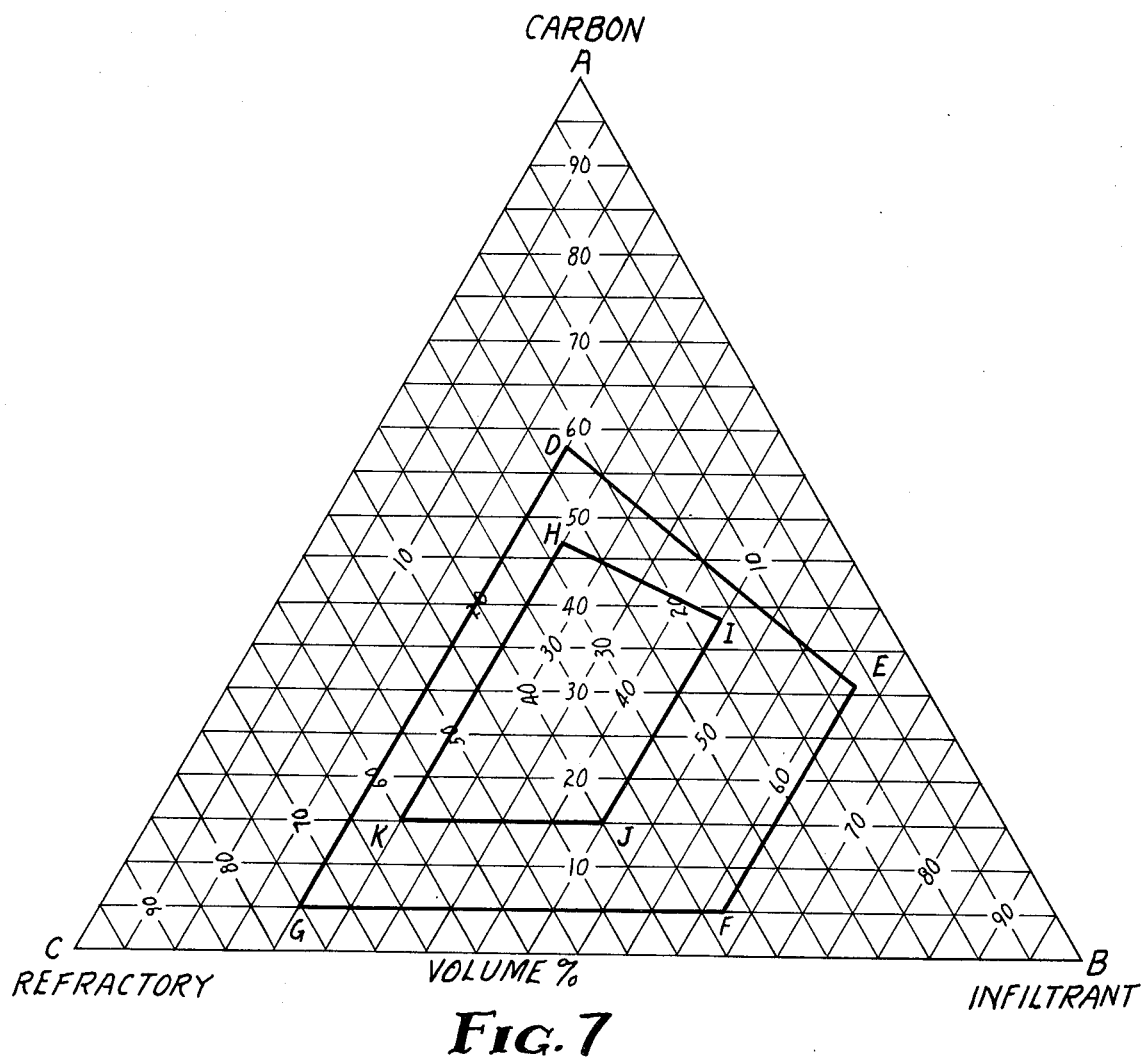
FIG. 7 is a ternary diagram illustrating compositions of the invention.

The compositions of the EDM electrodes of the present invention may be further understood by reference to FIG. 7. In FIG. 7, apex A of the ternary diagram represents a 100 volume percent carbon composition, apex B represents a 100 volume percent infiltrant metal composition, and apex C represents a 100 volume precent refractory composition. The boundaries of trapezoid DEFG and the area within them represent preferred compositions for EDM electrodes of the present invention prepared from green molded preforms containing the indicated amounts of carbon and refractory (plus a binder occupying the space later filled by the infiltrant) which preforms are then infiltrated with the indicated amounts of infiltrant. In general, as one crosses the boundary DE in FIG. 7 in the direction of higher carbon volume percent (i.e. from inside DEFG to the area above and to the right of it), the surface area of carbon in comparison to the surface area of refractory becomes so great that the preform cannot be thoroughly infiltrated. As one crosses the boundary EF in the direction of higher infiltrant metal volume percent (i.e. with an eventual infiltrant metal volume percent greater than about 62 volume percent), the skeletal preform has such a large unoccupied void area (connected porosity) prior to the infiltration step that it does not possess sufficient rigidity to survive infiltration. An EDM electrode made with such a composition will tend to "slump" or collapse during the infiltration step. An EDM electrode with a composition along the ternary diagram boundary joining apex B and apex C in FIG. 7 contains essentially no carbon and would resemble the EDM electrodes made from pure refractory skeletal preforms described in U.S. Pat. Nos. 3,823,002 and 3,929,476. The skeletal preforms described in U.S. Pat. Nos. 3,823,002 and 3,929,476 may contain some carbonaceous residue after the binder is thermally degraded and removed, but such carbon would only be present as a submicron amorphous carbon residue (i.e. as particles or a film less than about 1 micrometer in thickness), and in small quantities. The majority (i.e., greater than 50 percent) of the free carbon particles in a shaped, infiltrated EDM electrode of the present invention are greater than 1 micrometer in mean diameter. As one crosses the boundary GD in the direction of lower infiltrant metal volume percent (i.e. with an eventual infiltrant metal volume percent less than about 20 volume percent), it is difficult to achieve efficient packing by vibratory molding using commercially available sizes of carbon and refractory granules. Compositions within DEFG but near line GD (i.e. those with a low eventual infiltrant volume percent) generally require very careful control of particle sizes, i.e. relatively large carbon granules and much smaller refractory granules with a bimodal particle size distribution.

The boundaries of trapezoid HIJK and the area within them in FIG. 7 represent most preferred compositions for EDM electrodes of the present invention. The skeletal preform used to make such an electrode should have a connected porosity greater than about 25 volume percent, i.e. the electrode should have an infiltrant metal volume percent greater than about 25 volume percent, because attainment of connected porosities below about 25 volume percent generally requires careful control of particle sizes in the preform matrix. Also, the preform should have a connected porosity less than about 45 volume percent, i.e., the electrode should have an infiltrant metal volume percent less than about 45 volume percent, because use of higher amounts of infiltrant metal generally leads to increased shrinkage. In addition, the amount of carbon in the preform should be above about 15 volume percent, because this results in lower costs and improved EDM cutting performance. Finally, the amount of carbon and refractory in the preform should be less than that represented by boundary HI, in order to insure that the matrix skeleton can be thoroughly infiltrated. It should be emphasized that HIJK is based on the use of commercially available granular raw materials, and that its boundaries will depend somewhat upon the size distribution and surface area of the granular raw materials chosen. Also, it must be borne in mind that the aforementioned general relationship $$\frac{(\text{volume \% C})(\text{surface area C})}{(\text{volume \% R})(\text{surface area R})} < \text{about 75}$$

should be observed in order to achieve complete infiltration.

In general, as the volume percent of infiltrant metal is reduced, processing shrinkage of the electrode is minimized. In addition, as the volume percent of refractory relative to carbon is reduced, EDM roughing mode cutting rate is increased, although workpiece surface finish will roughen and electrode end and corner wear will increase.

Objects and advantages of this invention are illustrated in the following examples but the amounts and materials described in the examples, and various additions and details recited therein, should not be construed to limit the scope of this invention. Example 2 and one of the runs in Example 3 are comparative examples outside the scope of the present invention.

EXAMPLE 1

An EDM master was prepared by cutting a 5 cm long piece of 1.25 cm steel bar stock, polishing the cut ends, and boring a 1.2 mm axial hole through the cut piece. A flexible female mold corresponding to this shape was made using "RTV-J" silicone curable rubber (commercially available from Dow Corning). An EDM electrode containing 30 volume percent graphite, 40 volume percent copper, and 30 volume percent tungsten was then prepared according to the present invention as follows. A sample of "A-200" graphite granules (commercially available from Union Carbide Co. of Canada) which had a mean particle size of 22 micrometers with 95 volume percent greater than 7 micrometers, 5 volume percent greater than 50 micrometers, and a maximum particle size of 74 micrometers was obtained. The graphite sample appeared to have a Gaussian particle size distribution as measured by Coulter Counter. A bimodal distribution of tungsten granules was prepared by combining 80 wt.% of 15 micrometer tungsten granules (commercially available from General Electric Co.) with 20 wt.% 1.5 micrometer tungsten granules (commercially available from General Electric Co.). Twenty seven grams of the above graphite granules and 230 g of the above bimodal tungsten granule mixture were then combined by dry mixing to form a powder mixture. The dry granules were poured onto a heated rubber mill and combined with 15 g of binder ("Emerest 2642", a polyethylene glycol distearate with number average molecular weight of 400, commercially available from Emery Industries). The mill rolls were maintained at a temperature of about 80° C. This mixture was milled for about 15 minutes and resulted in a thixotropic warm powder-binder mixture.

The warm powder-binder mixture and the flexible mold were brought to 65° C. by storing in a 65° C. oven for about 15 minutes. The powder-binder mixture was then flowed into the flexible mold by vibratory means. The mixture was deaired for 15 minutes with continued vibration in a laboratory vacuum chamber operated at 1 torr. The mold and contents were then cooled to 0° C. in a freezer and the hardened, green molded preform subsequently extracted from the rubber mold cavity using vacuum.

The green molded preform was placed in a supporting bed of powdered alumina and heated in a resistance heated box furnace with a dynamic argon atmosphere. A temperature of approximately 400° C. was sufficient to volatilize and thermally degrade most of the binder. Heating was discontinued when the temperature reached 780° C., at which point the binder had essentially completely degraded and the skeletal particles of carbon and tungsten had become tacked together, forming a skeletal preform.

The shaped skeletal preform was removed from the furnace after it had cooled to room temperature. An acetone dispersion of zirconia (50% by volume) was applied to all but one surface (the base) of the shaped preform in order to prevent the infiltrant metal from overwetting the working surfaces. The base of the preform was then placed adjacent 135 g of solid copper on a bed of alumina in an open graphite crucible in a molybdenum wound electrical resistance furnace. The furnace was evacuated to 0.1 torr and refilled with argon to atmospheric pressure and maintained at a flow rate of 0.47 liters/second. The furnace was heated to 1120° C. and held at that temperature for 45 minutes in order to carry out infiltration of the skeletal preform by copper infiltrant. The furnace was then turned off and allowed to cool normally. The infiltrated EDM electrode was removed from the crucible and excess flashing dressed off.

Dimensional change during processing was measured by comparing the 1.25 cm square end of the master shape to the final molded electrode along two perpendicular axes and averaging the change in dimension. The electrode was tested for cutting performance using a Charmilles D-10 EDM machine in two cutting modes (finishing and roughing). EDM settings were 3 ampere maximum, 2 microseconds on, 3 microseconds off for finish mode, and 25 ampere maximum, 25 microseconds on, 4 microseconds off for rough mode. The wear ratio was determined by comparing the ratio of work piece cutting depth to electrode longitudinal wear. For consistency, constant amounts of material were removed for this and each of the following electrode tests, i.e. 0.076 mm depth for finish mode and 2.5 mm for roughing mode. The finished electrode made by this process exhibited the following preformance:

Dimensional Change: $-0.6\%$
Finish cutting rate: 1.7 mm$^3$/min.
Finish wear ratio: 29.9
Rough cutting rate: 162 mm$^3$/min.
Rough wear ratio: 20.5

The fraction (see formula I, above)

$$\frac{(\text{volume \% C})(\text{surface area C})}{(\text{volume \% R})(\text{surface area R})}$$

in this example was $$\frac{(30)(6.72)}{(40)(0.15)} = 33.6$$

EXAMPLE 2

An attempt was made to prepare an EDM electrode using the method of Example 1 but with 40 to 200 micrometer graphite (Asbury "1264", commercially available from Asbury Graphite Mills) and 40 to 200 micrometer tungsten ("M-70", commercially available from GTE Sylvania). Ambient pressure infiltration did not take place.

The fraction I in this example was $$\frac{(30)(2.85)}{(40)(0.01)} = 214$$

EXAMPLE 3

The comparative test preformed in Examples 1 and 2 was repeated using a lower graphite volume percentage. A preform containing 15 volume percent graphite granules ("A-200", as used in Example 1) and 41 volume percent tungsten granules (a bimodal mixture as used in Example 1) was infiltrated by ambient pressure infiltration. A preform containing 15 volume percent graphite granules (Asbury "1264", as used in Example 2) and 41 volume percent tungsten granules ("M-70", as used in Example 2) could not be infiltrated by ambient pressure infiltration. The calculations of Example 1 and Example 2 were repeated. For the sample which infiltrated by ambient pressure infiltration, the fraction I was:

$$\frac{(15)(6.72)}{(41)(0.15)} = 16.4$$

For the sample which failed to infiltrate by ambient pressure infiltration, the fraction I was:

$$\frac{(15)(2.85)}{(41)(0.01)} = 104$$

EXAMPLES 4–27

Using the method of Example 1, several EDM electrode compositions were prepared and evaluated for performance. A thermoset binder was used in Example 15. It was prepared by combining 28 volume % "Epon" 825 epoxy resin (Shell Chemical Co.), 12 volume % "Epon" F-2 amine curing agent, 30 volume % "Carbowax" 400 (a polyethylene glycol with a number average molecular weight of 400, commercially available from Union Carbide Co. of Canada), and 30 volume % 1,3-butanediol. The preform of Example 15 was cured by heating to 38° C. for 18 hours. The results for Examples 4 to 27 are set out below in tabular form:

TABLE III

| Ex. no. | Preform composition (volume % excluding void space) | | | Final electrode composition (volume %) | | | | | Dimensional change (%) | Cutting rate for 12.5 × 12.5 mm electrode (mm$^3$/min) | | Wear ratio | |
|---|---|---|---|---|---|---|---|---|---|---|---|---|---|
| | C$^a$ | W | Other$^b$ | C$^a$ | W | Other$^c$ | Cu | Alloy | | Finish$^d$ | Rough$^e$ | Finish$^d$ | Rough$^e$ |
| 4 | | 100$^f$ | | | 70 | | 30 | | −0.7 | 2.1 | 100 | 7.5 | 65.6 |
| 5 | 7 | 93$^f$ | | 5 | 64.7 | | 30.3 | | −0.7 | 2.3 | 120 | 5.8 | 32.9 |
| 6 | 7 | 93$^f$ | | 5 | 64.7 | | | 30.3$^g$ | −0.6 | 3.4 | 119 | 9.5 | 32.9 |
| 7 | 30 | 70$^f$ | | 17.7 | 41.3 | | 41 | | −2.0 | 3.8 | 174$^h$ | 5.8 | 9.8$^h$ |
| 8 | 30 | 70$^f$ | | 17.7 | 41.3 | | | 41$^i$ | −2.0 | 4.0 | 194$^h$ | 3.8 | 19.7$^h$ |
| 9 | 40 | 60$^f$ | | 23.5 | 35.2 | | 41.3 | | −3.3 | 3.6 | 174 | 15.2 | 19.7 |
| 10 | 40 | 60$^f$ | | 23.5 | 35.2 | | | 41.3$^j$ | −2.0 | 4.2 | 167 | 1.5 | 9.0 |
| 11 | 50 | 50$^k$ | | 25 | 25 | | 50 | | 0 | 2.5 | 169$^h$ | 1.5 | 14.0$^h$ |
| 12 | 50 | 50$^k$ | | 25 | 25 | | | 50$^l$ | +0.2 | 2.6 | 127$^h$ | 2.7 | 8.2$^h$ |
| 13 | 50 | 50$^m$ | | 25 | 25 | | 50 | | 0 | 4.6 | 176$^h$ | 3.8 | 6.6 |
| 14 | 50 | 50$^n$ | | 25 | 25 | | 50 | | +0.2 | 3.0 | 149$^h$ | 3.8 | 21.0 |
| 15$^p$ | 50$^q$ | 50$^f$ | | 30$^q$ | 30 | | 40 | | −0.8 | — | 183$^r$ | — | 100$^r$ |
| 16 | 80 | 20$^k$ | | 31.3 | 7.8 | | 60.9 | | −4.1 | 5.6 | 175 | 3.3 | 7.9 |
| 17 | | | 100$^s$ | | | 50$^t$ | 50 | | 0.9 | 1.4 | 82 | 3.3 | 37.9 |
| 18 | 15 | | 85$^s$ | 6.2 | | 37.2$^t$ | 56.6 | | −1.1 | 3.3 | 111 | 9.5 | 12.3 |
| 19 | 60$^u$ | | 40$^s$ | 33 | | 22$^t$ | 45 | | −0.7 | 6.1 | 165 | 9.5 | 12.3 |
| 20 | 65$^v$ | | 35$^s$ | 39.9 | | 21.5$^t$ | 38.6 | | −0.5 | 4.4 | 131 | 3.0 | 9.4 |
| 21 | 65 | | 35$^w$ | 33.2 | | 17.9$^t$ | 48.9 | | — | — | 161 | — | 12.3 |
| 22 | | | 100$^x$ | 26.2 | | 17.5$^t$ | 56.3 | | −4.1 | 4.2 | 80 | 3.0 | 10.4 |
| 23 | 60 | | 40$^y$ | 29.1 | | 19.4$^y$ | 51.6 | | −3.3 | 3.8 | 149 | 3.0 | 10.4 |
| 24 | 50$^z$ | | 50$^{aa}$ | 30$^z$ | | 30$^{aa}$ | 40 | | −0.6 | 3.0 | 183 | 6.0 | 24.6 |
| 25 | 30$^k$ | | 70$^{bb}$ | 30.4 | 15.6 | 5.8 | 48.2 | | 0 | 4.2 | 167 | 3.0 | 14.0 |
| 26 | 30$^k$ | | 70$^{bb}$ | 30.4 | 15.6 | 5.8 | 48.2$^g$ | | 0 | 3.8 | 129 | 25.3 | 13.1 |

TABLE III-continued

| Ex. no. | Preform composition (volume % excluding void space) | | | Final electrode composition (volume %) | | | | | Dimensional change (%) | Cutting rate for 12.5 × 12.5 mm electrode (mm³/min) | | Wear ratio | |
|---|---|---|---|---|---|---|---|---|---|---|---|---|---|
| | $C^a$ | W | Other$^b$ | $C^a$ | W | Other$^c$ | Cu | Alloy | | Finish$^d$ | Rough$^e$ | Finish$^d$ | Rough$^e$ |
| 27 | | | 26$^s$/74$^{bb}$ | 30 | | 20 | 50 | | −0.7 | 4.6 | 121 | 4.2 | 7.3 |

$^a$Carbon was "A-200" graphite granules (Union Carbide Co. of Canada), unless otherwise indicated
$^b$Either Mo, WC, Mo$_2$C, or molybdenum coated graphite
$^c$Either Mo, WC, or Mo$_2$C
$^d$EDM settings were 3 ampere maximum, 2 microseconds on, 3 microseconds off, unless otherwise indicated
$^e$EDM settings were 25 ampere maximum, 25 microseconds on, 4 microseconds off, unless otherwise indicated
$^f$Bimodal distribution consisting of 65 wt. % 15 micrometer W and 35 wt. % 1.5 micrometer W
$^g$80% Cu, 20% Sn
$^h$EDM settings were 25 ampere maximum, 200 microseconds on, 25 microseconds off
$^i$90% Cu, 10% Ag
$^j$75% Cu, 15% Ni, 10% Sn
$^k$0.8 micrometer W
$^l$60% Cu, 20% Ni, 20% Mn ("Chace alloy")
$^m$1.5 micrometer W
$^n$8 micrometer W
$^p$Thermoset binder prepared from 28 vol. % "Epon" 825 (Shell Chemical Co.), 12 vol. % "Epon" F-2 (Shell Chemical Co.), 30 vol. % "Carbowax" 400 (Union Carbide Co.), and 30 vol. % 1,3-butanediol
$^q$"1264" graphite granules (Asbury Graphite Mills)
$^r$EDM settings were 25 ampere maximum, 400 microseconds on, 25 microseconds off
$^s$6 micrometer Mo
$^t$Mo
$^u$No. 2 Natural Flake Graphite (Dixon Carbon Co.)
$^v$"Versar" spherical carbon beads (Versar Carbon Co.)
$^w$"SD-252" molybdenum 0.8 micrometer particles which form aggregates approximately 8 micrometers in size (GTE Sylvania Inc.)
$^x$75/25 wt. % Mo coated graphite (Sherritt Gordon Mines, Ltd.,)
$^y$Bimodal distribution consisting of 65 wt. % WC ("SC-60", General Electric Co.) and 35 wt. % WC ("WOOO-PL", Wah-Chang Div. of Teledyne Corp.)
$^z$"4349" graphite granules (Asbury Graphite Mills)
$^{aa}$Mo$_2$C (Ventron Corp.)
$^{bb}$50/50 wt. % Mo coated graphite (Sherritt Gordon Mines, Ltd.)

Various modifications and alterations of this invention will be apparent to those skilled in the art without departing from the scope and spirit of this invention and the latter should not be restricted to that set forth herein for illustrative purposes.

What is claimed is:

1. A process for forming an electrical discharge machining electrode, comprising the steps of:

(a) dry blending granules of carbon and granules of a refractory selected from the group consisting of tungsten, molybdenum, carbides of either, and stoichiometric and hyperstoichiometric carbides of the other elements of groups IVB, VB, and VIB of the Periodic Table of the Elements, said granules being combined according to the relationship $$\frac{(\text{volume \% C}) (\text{surface area C})}{(\text{volume \% R}) (\text{surface area R})} < \text{about 75}$$

wherein C is said carbon, R is said refractory, the volume percent terms are the fraction of said electrode occupied by C or R, and the surface area terms are the surface areas in m²/g of said carbon or refractory granules measured before said carbon or refractory granules are blended together, thereby forming a uniform mixture;

(b) warm mixing said granules with up to 62 volume percent of a thermoplastic or thermoset, heat fugitive, organic binder;

(c) molding the resulting mixture in a heated flexible mold, cooling said mold and its contents to room temperature, and demolding said contents thereby forming an essentially void-free green molded preform having the size and shape of said mold; and (d) heating said green molded preform to thermally degrade and remove the bulk of said binder, thereby forming a rigid, handleable, skeletal preform;

(e) placing said preform in contact with an infiltrant comprising copper, silver, or alloys containing copper or silver and heating said preform and said infiltrant above the melting point of said infiltrant at ambient pressure, whereby said infiltrant melts and wicks into the connected porosity of said preform by capillary action, and wherein the volume percent of said carbon, said refractory, and said infiltrant are on or within the boundaries DEFG of FIG. 7; and (f) cooling the infiltrated part to room temperature.

2. A process according to claim 1, further comprising the addition of powdered infiltrant metal to said uniform mixture of carbon and refractory.

3. A process according to claim 1, wherein said carbon is graphite, said refractory is tungsten, and said infiltrant is copper.

4. A process according to claim 1, wherein said carbon is graphite, said refractory is molybdenum, and said infiltrant is copper.

* * * * *